United States Patent [19]
Kim

[11] Patent Number: 6,101,587
[45] Date of Patent: Aug. 8, 2000

[54] DATA PROTECTION CIRCUIT FOR SEMICONDUCTOR MEMORY DEVICE

[75] Inventor: Sung-Sik Kim, Cheongju, Rep. of Korea

[73] Assignee: LG Semicon Co., Ltd., Choongcheongbuk-Do, Rep. of Korea

[21] Appl. No.: 09/145,978

[22] Filed: Sep. 3, 1998

[30] Foreign Application Priority Data

Sep. 30, 1997 [KR] Rep. of Korea ............ 97-50435

[51] Int. Cl.[7] ............................................. G06F 12/14
[52] U.S. Cl. ................... 711/163; 711/211; 713/200; 365/230.02; 365/195
[58] Field of Search ..................... 711/211, 163; 365/230.02, 189.07, 195; 713/200

[56] References Cited

U.S. PATENT DOCUMENTS

| | | | |
|---|---|---|---|
| 3,618,040 | 11/1971 | Iwamoto et al. | 711/3 |
| 3,742,458 | 6/1973 | Inoue et al. | 711/154 |
| 4,087,856 | 5/1978 | Attanasio | 713/200 |
| 4,264,953 | 4/1981 | Douglas et al. | |
| 4,368,515 | 1/1983 | Nielsen | 711/212 |
| 4,377,844 | 3/1983 | Kaufman | 711/220 |
| 4,495,575 | 1/1985 | Eguchi | 711/3 |
| 4,519,036 | 5/1985 | Green | 713/200 |
| 4,521,853 | 6/1985 | Guttag | 711/163 |
| 4,583,196 | 4/1986 | Koo | 713/200 |
| 4,646,234 | 2/1987 | Tolman et al. | 380/4 |
| 4,716,586 | 12/1987 | Bauer | 380/3 |
| 5,058,164 | 10/1991 | Elmer et al. | 380/50 |

Primary Examiner—Jack A. Lane
Attorney, Agent, or Firm—Morgan, Lewis & Bockius LLP

[57] ABSTRACT

A data protection circuit is provided in a semiconductor memory device equipped with a row address decoder decoding a row address signal and selecting a word line, a column address decoder decoding a column address signal and selecting a bit line, and a memory cell array writing and reading to and from a memory cell in accordance with data selection signals outputted respectively from the row address decoder and the column address decoder. The data protection circuit includes an address conversion unit for executing a program in accordance with a user's program so as to output a stored data value, converting an externally applied address signal in accordance with the stored data value, and outputting the converted address signal, and an address selection unit for comparing the stored data value inputted from the address conversion unit with a user data value, and selectively outputting the converted address signal inputted from the address conversion unit or the externally applied address signal in accordance with the compared resultant value.

9 Claims, 3 Drawing Sheets

DATA PROTECTION CIRCUIT FOR SEMICONDUCTOR MEMORY DEVICE

BACKGROUND OF THE INVENTION

1. Field of the Invention

The present invention relates to a data protection circuit for a semiconductor memory device, and more particularly, to an improved data protection circuit for a semiconductor memory device, wherein an address signal is encoded by a key data signal inputted by a user for thereby protecting memory cell data.

2. Description of the Background Art

As shown in FIG. 1, a conventional semiconductor memory device includes: a row address decoder 10 decoding an n-bit row address signal of an address signal ADD inputted from an external address signal generator (not shown) and thereby selecting a word line; a column address decoder 20 decoding an m-bit column address signal of an address signal ADD inputted from the external address signal generator (not shown) and thereby selecting a bit line; and a memory cell array 30 storing data signals written into memory cells thereof selected by word lines and bit lines in accordance with output signals from the row address decoder 10 and the column address decoder 20, and externally outputting the stored data read from the memory cells selected therein.

The operation of the thusly constituted conventional semiconductor memory device will now be described with reference to FIG. 1.

First, when the n-bit row address signal and the m-bit column address signal of the address signal ADD are inputted from the external address signal generator (not shown), the row address decoder 10 decodes the n-bit row address signal and selects a word line of the memory cell array 30, whereas the column address decoder 20 decodes the m-bit column address signal and selects a bit line of the memory cell array 30.

During a read operation, the data signals stored in respective cells of the memory cell array 30 that correspond to the word lines and the bit lines which are selected by the row address decoder 10 and the column address decoder 20 are externally outputted through an output terminal in accordance with a read operation control by a memory controller (not shown).

Also, during a write operation, new data signals are stored in respective memory cells of the memory cell array 30 selected by the row address decoder 10 and the column address decoder 20, in accordance with a write operation control by the memory controller (not shown).

However, the conventional memory device has a disadvantage, in that the data stored in a memory cells may be read out even by a simple knowledge of a memory address, whereby the data may be accessed by others besides an authorized user.

SUMMARY OF THE INVENTION

Accordingly, it is an object of the present invention to provide a data protection circuit for a semiconductor memory device, wherein an applied address signal is encoded by a key data signal inputted by a user for thereby preventing memory cell data from being undesirably accessed by others.

To achieve the above-described object, in a semiconductor memory device equipped with a row address decoder for decoding a row address signal and selecting a word line, a column address decoder decoding a column address signal and selecting a bit line, and a memory cell array writing and reading data into and from memory cells therein in accordance with word line and bit line selection signals outputted respectively from the row address decoder and the column address decoder, a data protection circuit includes an address conversion unit for executing a program in accordance with a user's program so as to output a stored data value, converting an externally applied address signal in accordance with the stored data value, and outputting the converted address signal, and an input address selection unit for comparing the stored data value inputted from the address conversion unit with a user data value, and selectively outputting the converted address signal inputted from the address conversion unit or the externally applied address signal in accordance with the compared resultant value.

The object and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

With reference to the accompanying drawings, the data protection circuit for a semiconductor memory device according to the present invention will now be described.

Figure 1:
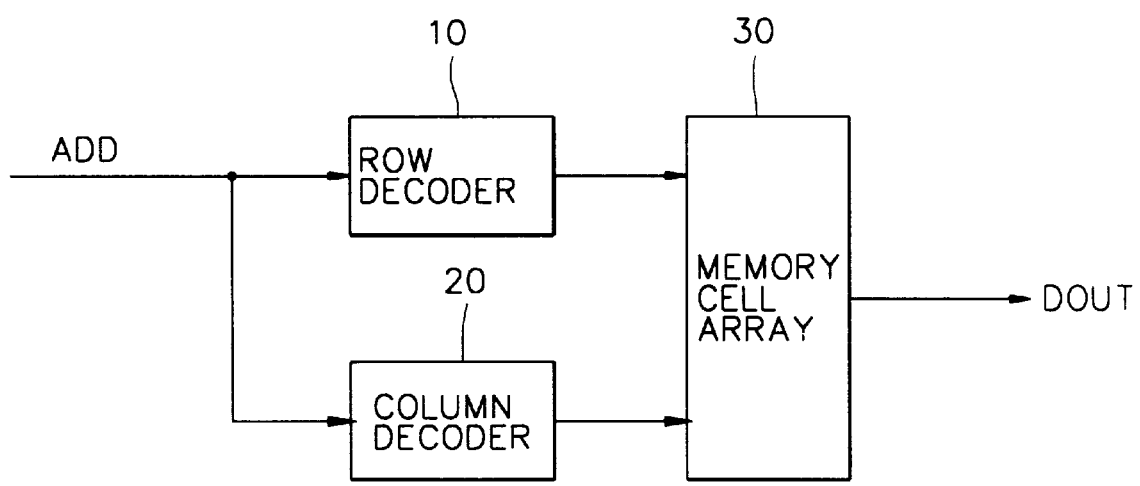
FIG. 1 is a block diagram schematically illustrating a conventional semiconductor memory device.
Figure 2:
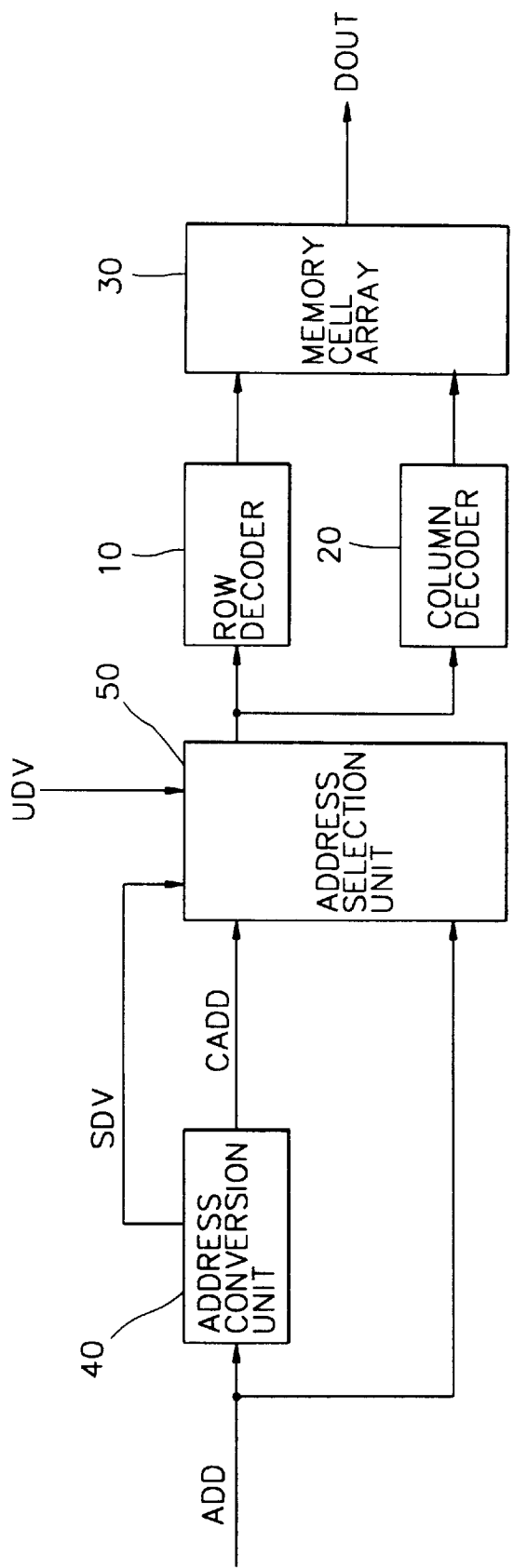
FIG. 2 is a block diagram schematically illustrating a data protection circuit for a semiconductor memory device according to the present invention.

As shown in FIG. 2, wherein identical reference numerals designate portions thereof identical to the conventional semiconductor memory device, the data protection circuit for a semiconductor memory device in accordance with the present invention includes: a row address decoder 10 decoding an n-bit row address signal of an address signal ADD inputted from an external address signal generator (not shown) or a converted address signal CADD inputted from an address conversion unit 40 and thereby selecting a word line; a column address decoder 20 decoding an m-bit column address signal of an address signal ADD inputted from the external address signal generator (not shown) or a converted address signal CADD inputted from an address conversion unit 40 and thereby selecting a bit line; and a memory cell array 30 storing a data signal written into a memory cell that corresponds to the word line and the bit line selected by output signals from the row address decoder 10 and the column address decoder 20, and externally outputting the stored data signal read therefrom.

The data protection circuit for a semiconductor memory device in accordance with the present invention further includes an address conversion unit 40, and an address selection unit 50.

Figure 3:
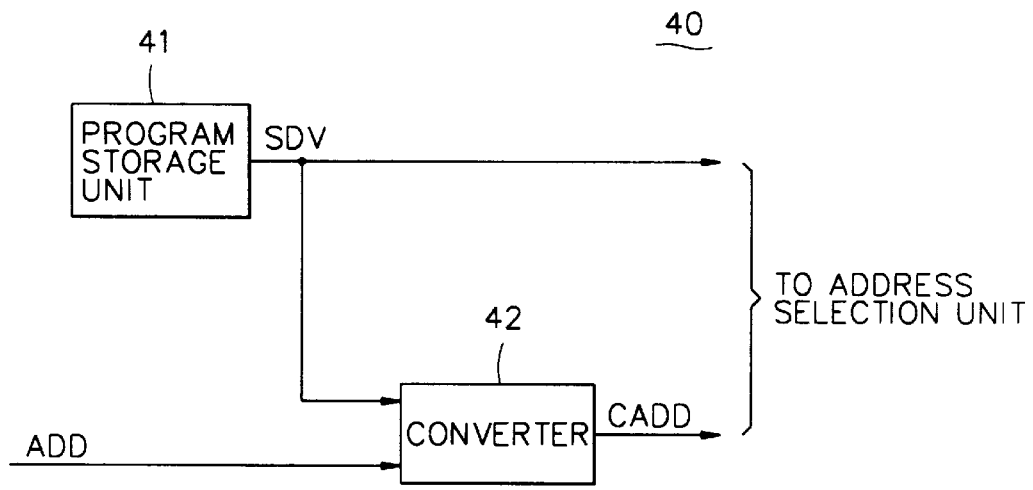
FIG. 3 is a block diagram schematically illustrating the structure of an address signal conversion unit in the circuit of FIG. 2.

As shown in FIG. 3, the address conversion unit 40 includes a program storage unit 41 executing a program previously stored by a user and thereby outputting a stored data value SDV, and a converter 42 converting an address signal ADD inputted from an external address generator (not shown) in accordance with the stored data value SDV and outputting the thusly converted address signal CADD.

The address selection unit 50 compares the stored data value SDV with a user data value UDV inputted by a user and selectively outputs the converted address signal CADD inputted from the address conversion unit 40 or the externally applied address signal ADD in accordance with the compared resultant value.

Here, the program storage unit 41 may be formed of a flash memory or an EPROM or the like so as to enable a user to store the program in advance.

Figure 4:
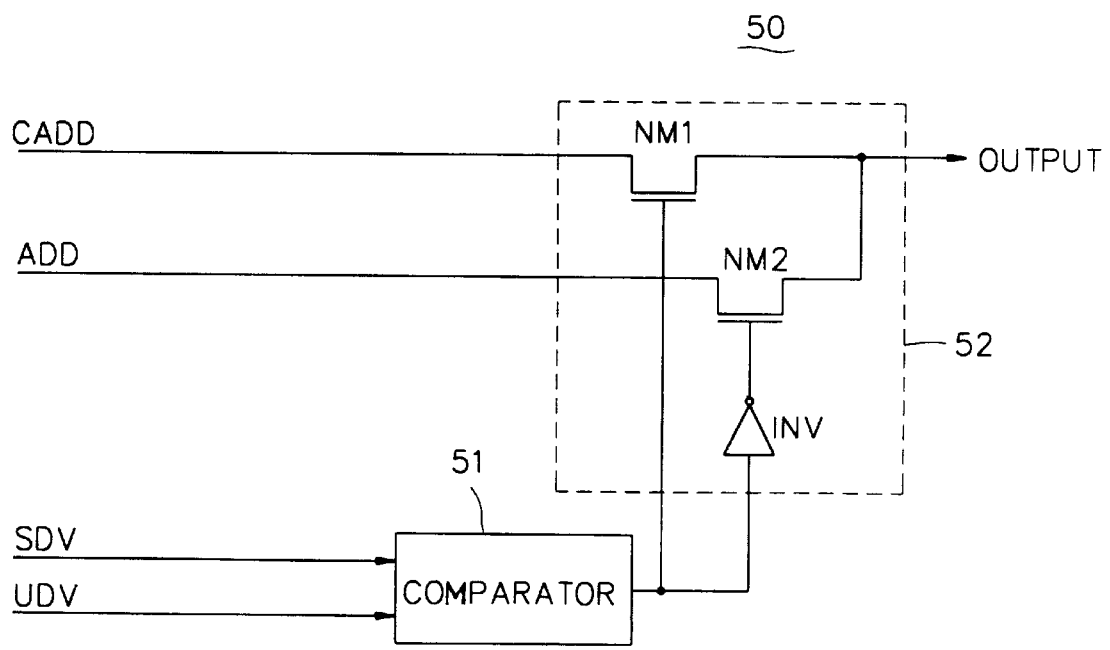
FIG. 4 is a block diagram schematically illustrating the structure of an address signal selection unit in the circuit of FIG. 2.

As shown in FIG. 4, the address selection unit 50 includes a comparator 51 comparing the stored data value SDV inputted from the address conversion unit 40 with a user data value UDV, and a selector 52 for selectively outputting the converted address signal CADD inputted from the address conversion unit 40 or an externally applied address signal ADD in accordance with an output value of the comparator 51.

The comparator 51 compares the stored data value SDV inputted from the address conversion unit 40 with the user data value UDV inputted by a user so as to detect whether the two vales correspond to each other, and there can be employed a general circuit device, for example, an exclusive NOR gate to determine whether the two signals are correspondent to each other when compared.

The selector 52 includes a first NMOS transistor NM1 controlled by the output of the comparator 51 and selectively outputting the compared address signal CADD, an inverter INV inverting the output of the comparator 51, and a second NMOS transistor NM2 selectively outputting the externally inputted address signal ADD by being controlled in accordance with the output of the inverter INV.

With reference to FIGS. 2 through 4, the operation of the data protection circuit for a semiconductor memory device according to the present invention will now be described.

First, during a read operation, a certain program only known to the user is stored in the program storage unit 41 composed by a flash memory or an EPROM or the like.

When an address signal ADD is inputted from the external address generator (not shown), the program storage unit 41 executes the stored program and outputs the stored data value SDV.

Subsequently, the converter 42 of the address conversion unit 40 converts the address signal ADD inputted from the external address generator (not shown) and outputs the converted address signal CADD in accordance with the stored data value SDV outputted from the program storage unit 41.

Here, the address conversion unit 40 may be differently constituted depending upon a user's design, and the address signal ADD converting operation being carried out in the converter 42 of the address conversion unit 40 causes the address signal ADD inputted from the external address generator (not shown) and the stored data value SDV generated by the program previously stored by the user to be added up for thereby outputting the externally applied address signal ADD and the converted address signal CADD. That is, the converter 42 may carry out other arithmetic operations instead of an adding operation for thereby converting the inputted address signal ADD.

The comparator 51 of the address selection unit 50 compares the stored data value SDV inputted from the address conversion unit 40 with the user data value UDV inputted by the user, and outputs "high" if the two values correspond to each other or "low" if the two values do not correspond to each other.

Therefore, the selector 52 of the address selection unit 50 allows the first NMOS transistor NMI to turn on when the signal outputted from the comparator 51 is "high" and thereby output the converted address signal CADD inputted from the address conversion unit 40. Also, the selector 52 of the address selection unit 50 allows the second NMOS transistor NM2 to turn on when the signal outputted from the comparator 51 is "low" and thereby output the address signal ADD inputted from the external address generator (not shown).

The row address decoder 10 and the column address decoder 20 respectively decode the n-bit row address signal and m-bit column address signal of the address signal ADD inputted from the external address generator (not shown) or the converted address signal CADD inputted from the address conversion unit 40 in accordance with the address selection unit 50, correspondingly select a word line and a bit line, so that the data stored in the corresponding memory cells are externally outputted through a data bus (not shown).

Therefore, the data outputted from memory cell array 30 when the stored data value SDV outputted from the address conversion unit 40 corresponds to the user data value UDV applied by the user are different from those outputted from the memory cell array 30 when the two data do not correspond to each other.

That is, because data are respectively stored in corresponding ones of the memory cells in accordance with the converted address signal CADD from the address conversion unit 40, when the data initially stored by the user is accessed by another person other than the user, the data becomes unavailable although an identical address signal is applied thereto.

Each time the data stored in the memory cells of the memory cell array 30 are to be employed, the data previously stored by the user may be newly inputted by the user or be programmed for automation.

Meanwhile, during a write operation, the data are stored in the memory cell array 30 in accordance with the converted address signal CADD by the address conversion unit 40 in the same way as in the above-described read operation.

As described above, in the data protection circuit for a semiconductor memory device according to the present invention, unless an accurate output value (converted address signal CADD) from the address conversion unit is known, a specific memory cell is not selected by the converted address signal, and accordingly there is outputted a data selected by the address signal ADD inputted from the external signal generator, whereby only the user is allowed to get access to the data stored in the memory cell corresponding to the converted address signal CADD.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claim, and therefore all changes and modifications that fall within meets and bounds of the claim, or equivalences of such meets and bounds are therefore intended to embrace the appended claim.

What is claimed is:

1. In a semiconductor memory device which includes a first decoder for decoding a row address signal and selecting a word line, a second decoder for decoding a column address signal and selecting a bit line, and a memory cell array for writing and reading data to and from memory cells therein in accordance with word line and bit line selection signals outputted respectively from the first decoder and the second decoder, a data protection circuit, comprising:

an address conversion unit for executing a program in accordance with a user's program so as to output a stored data value, converting an externally applied address signal in accordance with the stored data value, and outputting the converted address signal, and an address selection unit for comparing the stored data value inputted from the address conversion unit with a user data value, and selectively outputting the converted address signal inputted from the address conversion unit or the externally applied address signal in accordance with the compared resultant value.

2. The data protection circuit of claim 1, wherein the address conversion unit comprises:

a program storage unit for executing a program previously stored by a user and thereby outputting a stored data value, and a converter for converting an externally applied address signal in accordance with the stored data value and outputting the thusly converted address signal.

3. The data protection circuit of claim 2, wherein the program storage unit is formed of one selected from a flash memory or an EPROM.

4. The data protection circuit of claim 2, wherein the program in the program storage unit is previously stored by a user so as to be executed each time the user employs the data stored in the memory cell array or stored by the user each time the user employs the data stored in the memory cell array.

5. The data protection circuit of claim 2, wherein the converter adds up the stored data value inputted from the program storage unit and the externally applied address signal or executes another operation for thereby outputting a converted address signal different from the externally applied address signal.

6. The data protection circuit of claim 1, wherein the address selection unit comprises:

a comparator for comparing the stored data value inputted from the address conversion unit with a user data value inputted by the user, and a selector for selectively outputting the converted address signal inputted from the address conversion unit or an externally applied address signal in accordance with an output value of the comparator.

7. The data protection circuit of claim 6, wherein the comparator comprises an exclusive NOR gate.

8. The data protection circuit of claim 6, wherein the selector comprises:

a first NMOS transistor controlled by the output of the comparator and selectively outputting the compared address signal, an inverter for inverting the output of the comparator, and a second NMOS transistor for selectively outputting the externally inputted address signal by being controlled in accordance with the output of the inverter.

9. The data protection circuit of claim 6, wherein the comparator compares the stored data value inputted from the address conversion unit with the user data value inputted by the user, and outputs "high" when the two values correspond to each other or "low" when the two values do not correspond to each other.

* * * * *